July 15, 1969     C. C. DE PEW     3,455,415
HANDICAPPING DEVICE FOR SULKY WHEELS
Filed Sept. 1, 1967     2 Sheets-Sheet 1
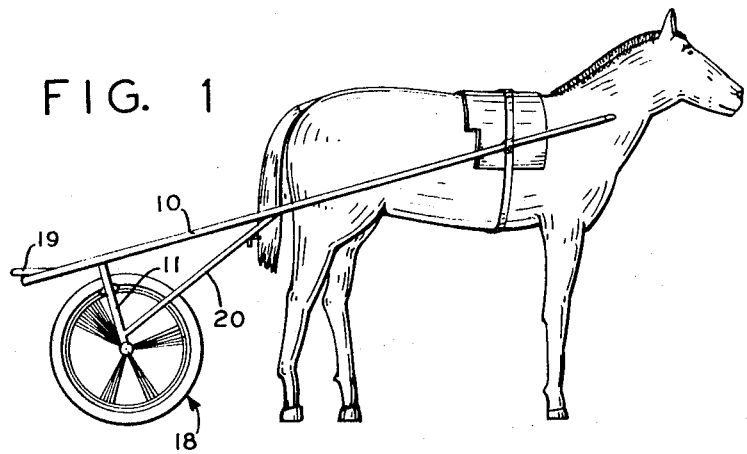
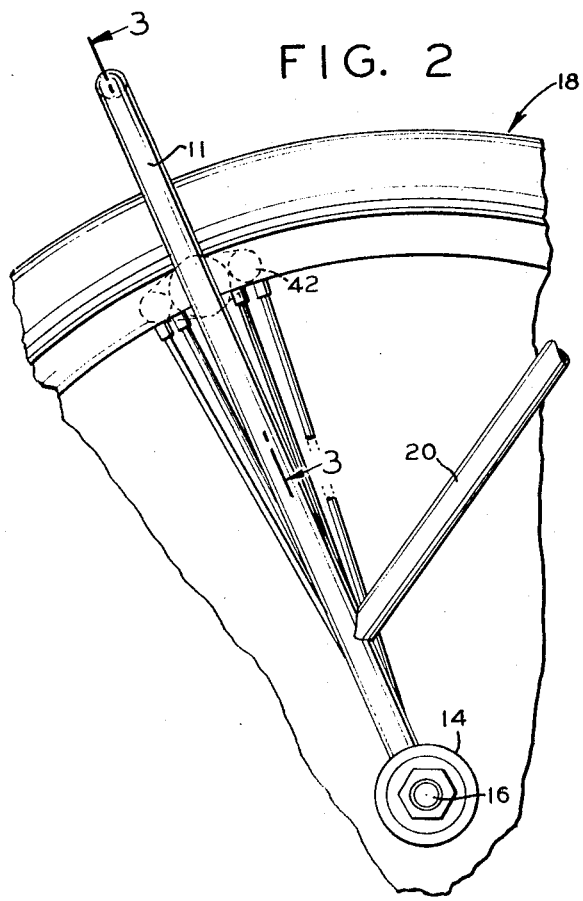
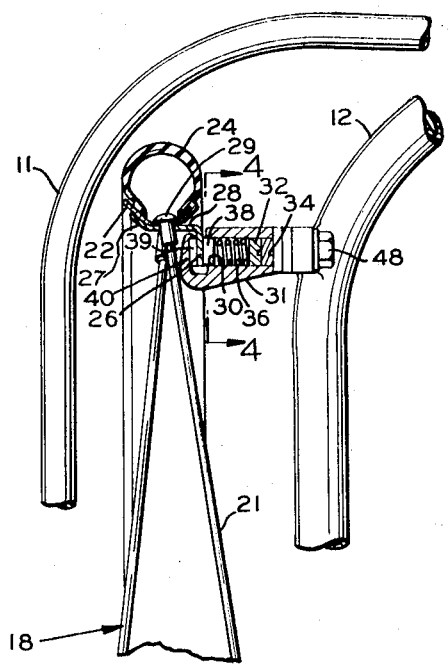
INVENTOR.
CHESTER C. DE PEW
BY
JOHN P. CHANDLER
HIS ATTORNEY.

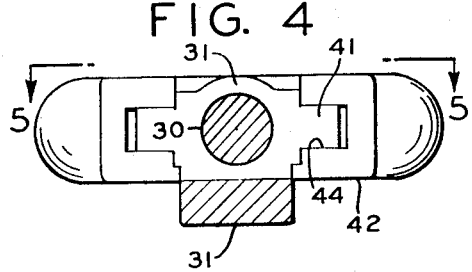
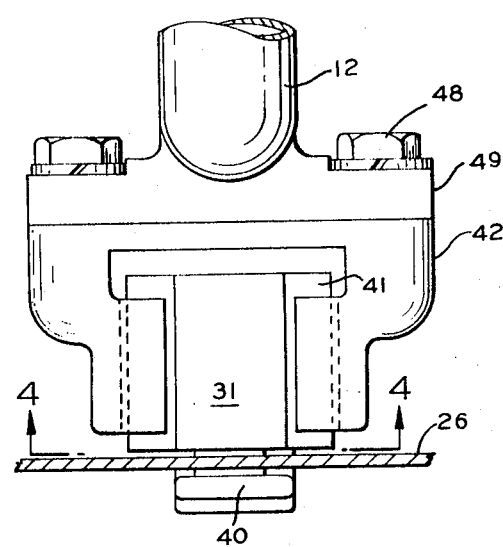
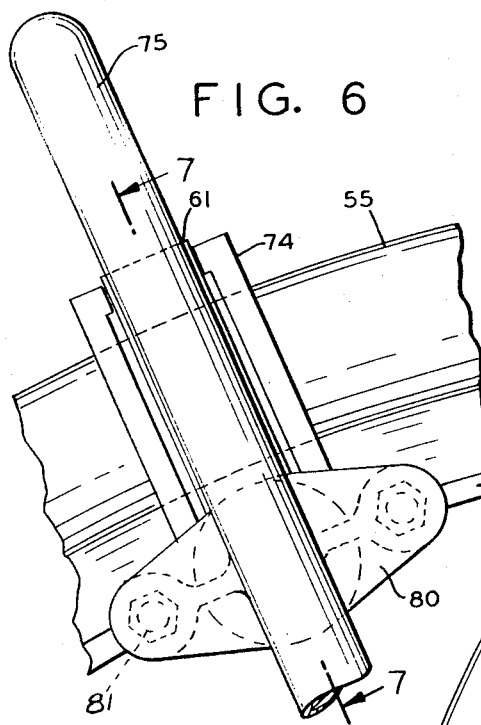
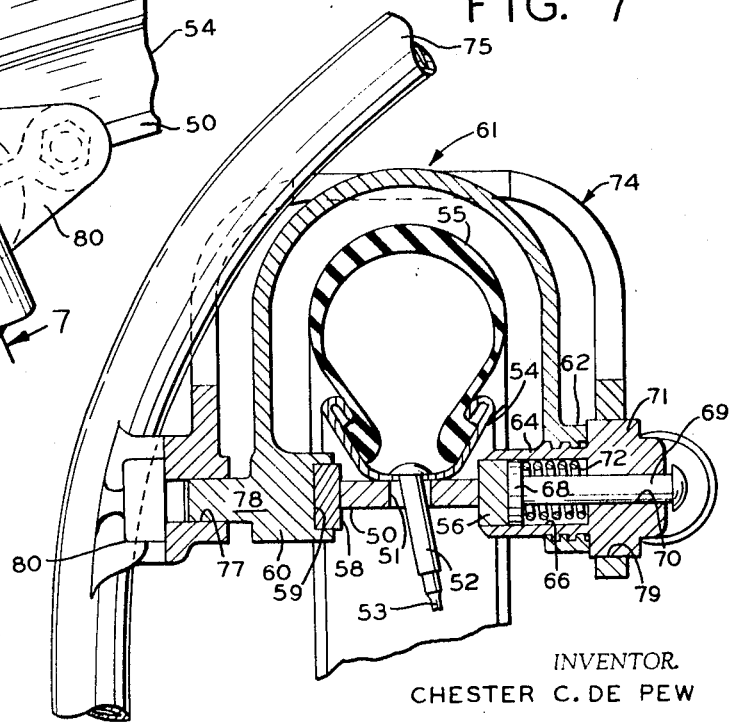

United States Patent Office 3,455,415
Patented July 15, 1969

3,455,415
HANDICAPPING DEVICE FOR SULKY WHEELS
Chester C. De Pew, 254 Prospect St.,
Farmingdale, N.Y. 11735
Filed Sept. 1, 1967, Ser. No. 665,114
Int. Cl. B60t 1/06; B62l 1/00; F16d 55/00
U.S. Cl. 188—17                                      4 Claims

ABSTRACT OF THE DISCLOSURE

A friction brake for use as a handicapping device for sulky wheels wherein friction discs apply a constant but adjustable frictional drag on opposed sides of a ring-like member carried at the rim of the wheel.

---

This invention relates to handicapping devices for sulkies used in harness racing and relates more particularly to an improved mechanism for effecting a constant but adjustable frictional drag on opposed sides of a ring-like member carried adjacent the rim of the sulky wheel for the purpose of imposing a handicap on the horse.

The frictional handicapping mechanism of the present invention can be readily altered to change the amount of handicap in accordance with a system devised for this purpose which achieves the same result as the handicapping system common to saddle racing. Some devices for accomplishing this result are incorporated in the axle of the wheel and operate in the manner of a coaster brake for bicycles. Another one has a friction member directly engaging the tire of the sulky wheel while a third type has an adjustable friction element pressing against the side of the rim or the disc itself in a disc-type wheel.

All of these arrangements are objectionable from a control or wear and repair point of view. It is, therefore, the principal object of the present invention to provide a friciton brake for sulky wheels having improved performance characteristics and wherein worn parts can be easily and quickly replaced at a minimum of expenses.

The significant improvement constituting the present invention consists in a separate ring-like member carried adjacent the rim of the sulky wheel and whose opposed sides are engaged by friction discs or pucks supported in a novel fashion on one of the forks of the sulky frame. The arrangement is such that when either the pucks or the ring become worn they can be replaced in a minimum amount of time.

Another object of the invention is to provide a novel braking arrangement which can be incorporated into the conventional sulky organization without any weakening or essential modification in the basic structure. The device also is such that it can be applied to a conventional sulky with ease and facility.

In the drawing:

FIG. 1 is a side elevation of a sulky having the handicapping device of the present invention;

FIG. 2 is an enlarged view of the fork shown in FIG. 1;

FIG. 3 is a broken section taken on line 3—3 of FIG. 2;

FIG. 4 is a broken section taken on line 4—4 of FIG. 3;

FIG. 5 is a broken section taken on line 5—5 of FIG. 4;

FIG. 6 is a broken side elevation showing a modification;

FIG. 7 is a section taken on line 7—7 of FIG. 6.

The sulky shown in FIG. 1 is of conventional type and has a frame structure including a pair of shafts 10 attached to the band around the horse, a fork on each side of the frame including an outer frame member 11, and an inner frame member 12, each of which extends to the opposite side of the structure. In most instances, the frictional brake of the present invention is applied to only one wheel of the sulky. The lower ends of the fork support bearings 14 which receive the opposed ends of a shaft 16 on the wheel 18 is journalled. A seat is shown at 19. A reinforcing strut or drag fork 20 extends between outer fork member 11 and the shaft 10.

The wheel is formed with spokes 21 leading to a central hub, an outer rim 22, and a tire 24. The caliper brake applies a predetermined constant frictional drag to a sheet metal ring 26 which is the handicapping force applied to the particular horse. This ring is carried adjacent rim 22 and whose face is parallel to the plane of rotation of the wheel. The ring has an adjoining section 28 at about right angles to section 22, terminating in an outer section 27. This intermediate section 28 has radially spaced openings which receive the usual tubular nuts 29 carried at the outer ends of the spokes, which nuts form a secure mounting for the brake ring.

The caliper brake used in connection with the present invention differs from conventional caliper brakes and has a bore 30 in its cylindrical body section 31, the outer end of the bore being threaded to receive externally threaded discs 32 having cross slots 34 for receiving a screw driver. These discs are adjustable and act as stops or abutments to apply a desired preload to a spring 36 which engages a movable friction disc 38. A fixed friction disc 39 is supported by an angular finger 40 carried by the body, and these brake discs apply the frictional drag to opposite sides of the brake ring 26.

The body 31 of the caliper brake has opposed flanges 41 and a bracket 42 has inwardly facing slots 44 which receive the flanges, thus providing a sliding transmission for the brake assembly. The bracket 42 is supported by screws 48 passing through a fixed mounting block 49 secured as by means of welding to inner frame 12 of the fork. The body 31 of the caliper brake is thus freely movable inwardly and outwardly to compensate for any surface irregularities or run out of brake ring 26.

In the modified arrangement of FIGS. 6 and 7 frictional drag is again applied to opposite sides of a ring carried by the rim of the wheel but in this instance the ring is of thicker construction and its opposed edges rather than its opposed faces are engaged by the friction applying discs. The ring 50 has spaced holes 51 to receive the tubular nuts 52 carried by spokes 53 which support tire rim 54. In this instance, the caliper brake is in the nature of a U-shaped frame or yoke extending clear around the rim 54 and tire 55. Friction is applied to opposed edges of ring 50 by friction discs 56 and 58, the latter of which is received in a recess 59 in a terminal block 60 at one end of yoke 61. A terminal nut 62 at the other end of the frame supports in threaded relation the cylindrical body 64 which supports the spring urged friction disc 56. The body has a bore 66 whose outer end receives friction disc 56 in an energized relation or position. The disc is engaged by the head 68 of a pin 69 supported for sliding movment in a bore 70 in an enlarged section 71 of the body. A spring 72 urges the pin forwardly.

A stationary clevis 74 is secured to block 80 by bolts 81 and the block is welded or otherwise secured to sulky frame 75 and this frame has a journal 77 to receive a bearing 78 carried by terminal block 60 and 62 in sliding position to permit adjustment for wheel runout or wobble. The opposite side of clevis 74 has a bearing 79 to receive enlarged section 71 of body 64 in sliding relation.

The embodiments of the invention in which an exclusive property or privilege is claimed are defined as follows:

1. In a handicapping device for a sulky provided with a pair of forks, supported by a frame, and wheels, each provided with a rim and a tire rotatably supported at the lower end of each fork, braking means for at least one of said wheels which includes a sheet metal ring supported by said wheel and formed with a central section positioned adjacent to the rim and having holes through which spokes of the wheel pass, an outer angular section engaging one side of the rim and an inner section lying at right angles to the central section and parallel to a plane of rotation of the wheel, and a caliper brake supported by the frame, friction discs supported by the caliper brake engaging opposed faces of said inner section of the ring to apply frictional resistance to rotation of the wheel, and preloaded spring means urging both of discs against the ring.

2. The structure defined in claim 1 wherein means are provided for varying the preload of the spring means.

3. The structure defined in claim 1 wherein sliding means are provided between the caliper brake and the frame for permitting the caliper brake to follow irregularities of the wheel and inner surface of the inner section of the ring.

4. The structure defined in claim 1 wherein the caliper brake is slidable inwardly and outwardly to compensate for wheel runout.

References Cited

UNITED STATES PATENTS

| | | | |
|---|---|---|---|
| 2,892,514 | 6/1959 | Gaines | 188—83 X |
| 2,997,136 | 8/1961 | Gaines | 188—17 |
| 3,096,853 | 7/1963 | Farrand | 188—18 |
| 3,103,259 | 9/1963 | Gaines | 188—17 X |

MILTON BUCHLER, Primary Examiner

THOMAS W. BUCKMAN, Assistant Examiner

U.S. Cl. X.R.

188—24, 73